United States Patent Office 3,651,207
Patented Mar. 21, 1972

3,651,207
PREPARATION FOR USE IN MOUTHWASH HAVING EFFERVESCENCE
Frederick L. Lauster, Massillon, and Sheldon W. Fantle, Canton, Ohio, assignors to Lafant Research Company, Canton, Ohio
No Drawing. Filed Dec. 14, 1970, Ser. No. 98,137
Int. Cl. A61k 7/16
U.S. Cl. 424—50
2 Claims

ABSTRACT OF THE DISCLOSURE

A preparation or formulation is provided, in loose powder form, or in the form of compressed tablets or wafers, which, when added to water, forms an effervescent mouthwash or mouthwash solution. The preparation contains anti-oxidants, preservatives, antacid or buffering agents, anti-irritants, bacteriostatic and therapeutic agents having healing properties, and flavoring agents, which conjointly act to form a mouthwash of pleasing flavor or taste, and after taste.

---

This invention relates generally to a preparation or formulation, which, when added to water, forms an effervescent mouthwash, which is highly effective in removing food and debris from the mouth which have been loosened by tooth brushing.

A primary object of the invention is to provide a preparation of the character described, which contains various ingredients, including medicaments, which are designed to perform specific functions in the oral cavity, in the course of regular use of the preparation as a mouthwash.

A further object of the invention is to provide a mouthwash preparation, which contains anti-oxidants, preservatives, effervescing agents, antacid or buffering agents, anti-irritants, bacteriostatic and therapeutic agents, agents having healing properties, and flavoring agents, which act conjointly to form a mouthwash of pleasing flavor and taste, and after taste.

A still further object of the invention is to provide a mouthwash preparation, in powder form, which can be used in such form, through small amounts added to water, or can be compressed, through admixture with a suitable binder, into tablet or wafer form, which tablets or wafers can be dropped into a glass of water to provide the mouthwash.

Other objects and advantages of the invention will become apparent in the course of the following description of the mouthwash.

The mouthwash preparation, in accordance with the invention, consists of the following ingredients, in the proportion by weight indicated, the proportions, in this instance, being expressed in grams:

| | Range | Preferred |
|---|---|---|
| Sodium phosphate, dibasic | 14–20 | 17 |
| Citric acid, monohydrate | 11–17 | 14 |
| Tartaric acid | 18–24 | 21 |
| Sodium bicarbonate | 17–23 | 20 |
| Potassium bicarbonate | 17–23 | 20 |
| Saccharin | .5–1.1 | .8 |
| Aluminum dihydroxy allantoinate | .05–.15 | .1 |
| Synthesized cinnamon | .75–1.25 | 1 |
| Allantoin proteinate | .05–.15 | .1 |
| Bismuth subcarbonate | 1.5–2.5 | 2 |
| Flavoring agents | 3–5 | 4 |
| Total, percent | 100 | 100 |

Sodium phosphate, dibasic, also known as disodium phosphate, hydrodisodium phosphate, and disodium orthophosphate ($Na_2HPO_4$) is available in the form of colorless, translucent crystals or white powder, the powder form being preferred in this formulation. It has effervescent properties, when added to water.

Citric acid, monohydrate ($H_3C_6H_5O_7 \cdot H_2O$) is available as colorless, odorless, translucent crystals, or as a white granular to fine crystalline powder, the granular form being preferred for the purposes of this invention. It has anti-oxidant and preservative properties.

Tartaric acid ($H_2C_4H_4O_6$), also known as dihydroxysuccinic acid, is available in the form of colorless, odorless, transparent crystals, or white, fine to granular, crystalline powder, has an acid taste, and is stable in air. The powder form is preferred in this formulation. It functions as an anti-oxidant in this mouthwash preparation.

Sodium carbonate ($NaHCO_3$), also known as sodium acid carbonate, is available in the form of white powder or crystalline lumps, the powder form being preferred in this formulation. It has antacid or buffering properties, which are highly desirable in the present formulation.

Potassium bicarbonate ($KHCO_3$), also known as potassium acid carbonate, is available in the form of colorless, odorless, transparent crystals or white powder, having a slightly alkaline, salty taste, the powder form being preferred in this formulation. Its use in this mouthwash is to effect isotonicity or buffering action.

Saccharin, in the small amount indicated, is a synthetic sweetening agent, used in conjunction with or blended with the flavoring agent or agents to be presently referred to.

Aluminum dihydroxy allantoinate, the formula of which is $Al(OH)_2C_4H_5N_4O_3$, is a clean white powder having bacteriostatic properties. It imparts advantageous therapeutic factors in the mouthwash, including a mild astringency which helps reduce bleeding of soft gums and helps to toughen the gums, antacid action, a cleansing of the mouth, due to its keratolytic action, and healing and anti-irritant activity wherever there is abrasion, soreness or irritation due to external causes, such as brushing, toothpicking, etc.

Synthesized cinnamon, in the small amounts indicated, imparts a desired, slightly astringent, taste to the mouthwash preparation.

Allantoin proteinate, or modified allantoin protein, is an anti-irritant and cleansing and healing aget.

Bismuth subcarbonate, variously known as bismuth oxycarbonate, bismuth "carbonate," and bismuth carbonate, basic ($BiO_2CO_3)_2 \cdot H_2O$ or $Bi_2O_3 \cdot CO_2 \cdot H_2O$, is a white or pale yellowish white, odorless, tasteless powder, and is a gastrointestinal protectant.

Flavoring agents include one or more of the essential oils, which impart an acceptable and pleasing flavor to the mouthwash, when used, and leave a lasting pleasant after taste. These essential oils or flavors include oil of spearmint, oil of wintergreen, oil of peppermint and menthol.

In making the foregoing mouthwash preparation, all of the ingredients are uniformly mixed, to form a homogeneous powder, which, in small amounts, is added to water, and, when thus added, provides a desirable and highly useful effervescent mouthwash.

In some cases, the mixture, when combined with small amounts of a compatible organic binder, can be compressed into the form of tablets or wafers, of a fixed or predetermined dosage or size, which can be dropped into water to thus provide an effervescent mouthwash.

The mouthwash, as thus formulated, has cleansing and germicidal properties not found in conventional mouthwashes, and is also highly pleasing to the taste.

It is understood that slight changes may be made in the formula or composition of the mouthwash, without departing from the spirit of the invention or the scope of the subjoined claims.

Having thus described our invention, we claim:

1. A mouthwash preparation, consisting of from 14 to 20% by weight of sodium phosphate, dibasic, from 11 to 17% citric acid, monohydrate, 18 to 24% tartaric acid, 17 to 23% sodium bicarbonate, 17 to 23% potassium carbonate, .5 to 1.1% saccharin, .05 to .15% aluminum dihydroxy allantoinate, .75 to .125% synthesized cinnamon, .05 to .15% allantoin proteinate, 1.5 to 2.5% bismuth subcarbonate, and 3 to 5% of a flavoring agent or agents.

2. A mouthwash preparation, consisting of about 17% by weight of sodium phosphate, dibasic, about 14% citric acid, monohydrate, about 21% tartaric acid, about 20% sodium bicarbonate, about 20% potassium bicarbonate, about .8% saccharin, about .1% aluminum dihydroxy allantoinate, about 1% synthesized cinnamon, about .1% allantoin proteinate, about 2% bismuth subcarbonate, and about 4% flavoring agent or agents.

No references cited.

RICHARD L. HUFF, Primary Examiner

U.S. Cl. X.R.

424—54, 57

UNITED STATES PATENT OFFICE
CERTIFICATE OF CORRECTION

Patent No. 3,651,207                    Dated  March 21, 1972

Inventor(s)  Frederick L. Lauster, et. al.

It is certified that error appears in the above-identified patent and that said Letters Patent are hereby corrected as shown below:

Column 3, line 7, ".125%" should read -- 1.25% -- .

Signed and sealed this 12th day of December 1972.

(SEAL)
Attest:

EDWARD M. FLETCHER, JR.                ROBERT GOTTSCHALK
Attesting Officer                      Commissioner of Patents